P. O. Soper,
Hay Knife.
Nº 61,576.          Patented Jan. 29, 1867.
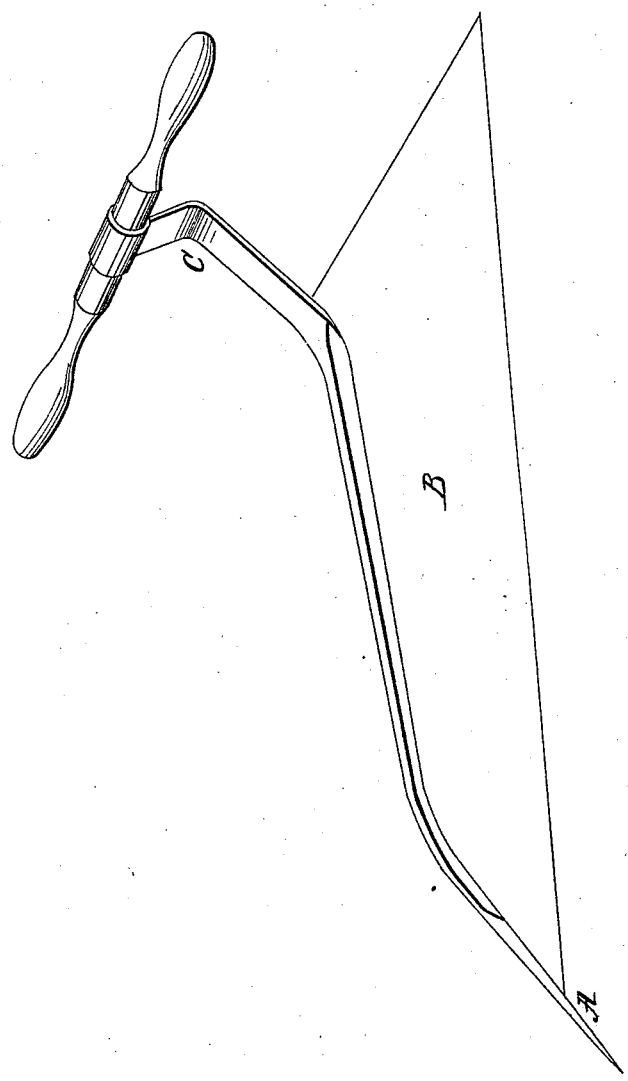
Witnesses:
Geo. H. Strong
T. J. Horn
Inventor:
Philo O. Soper

United States Patent Office.

PHILO O. SOPER, OF SAN FRANCISCO, CALIFORNIA.

Letters Patent No. 61,576, dated January 29, 1867.

IMPROVEMENT IN HAY KNIFE.

The Schedule referred to in these Letters Patent and making part of the same.

TO ALL WHOM IT MAY CONCERN:

Be it known that I, PHILO O. SOPER, of San Francisco, in the county of San Francisco, State of California, have invented a new and improved Hay Knife; and I do hereby declare that the following is a full and exact description thereof, reference being had to the accompanying drawings, and to the letters of reference marked thereon.

The nature of my invention consists in its self-feeding and oblique-cutting construction, the point A being the feeder; the blade B the cutter; with the bearing of the shank C as the knife is inserted its backward inclination is prevented by the hay in contact with the point A, thereby holding the knife to its work. The shank C standing parallel to the point A, with the yielding of the hay gives the knife an oblique direction, while the operator moves the knife perpendicularly.

I claim—

1. The point A in combination with the blade B, to act as a self-feeder.
2. The construction of the blade B.
3. The bearing of the shank C, for the uses and purposes as set forth.

PHILO O. SOPER.

Witnesses:
  JAS. B. FAITOUTE,
  GEORGE T. PATTISON.